US011773822B2

(12) United States Patent
Smith

(10) Patent No.: US 11,773,822 B2
(45) Date of Patent: Oct. 3, 2023

(54) WIND TURBINE BLADE

(71) Applicant: Vestas Wind Systems A/S, Aarhus N (DK)

(72) Inventor: Jonathan Smith, Southampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/785,479

(22) PCT Filed: Dec. 15, 2020

(86) PCT No.: PCT/DK2020/050365
§ 371 (c)(1),
(2) Date: Jun. 15, 2022

(87) PCT Pub. No.: WO2021/121507
PCT Pub. Date: Jun. 24, 2021

(65) Prior Publication Data

US 2023/0022674 A1 Jan. 26, 2023

(30) Foreign Application Priority Data

Dec. 17, 2019 (DK) .......................... PA 2019 70783

(51) Int. Cl.
*F03D 1/00* (2006.01)
*F03D 1/06* (2006.01)

(52) U.S. Cl.
CPC .... *F03D 1/0675* (2013.01); *F05B 2280/6002* (2013.01)

(58) Field of Classification Search
CPC ...... F03D 1/065; F03D 1/0675; F03D 1/0633; F03D 1/0683; F03D 1/0641
See application file for complete search history.

(56) References Cited

U.S. PATENT DOCUMENTS 7,922,454 B1 * 4/2011 Riddell ................. F03D 1/0675 416/224
2007/0189902 A1 * 8/2007 Mohamed ........... D03D 25/005 416/226

(Continued)

FOREIGN PATENT DOCUMENTS

EP 2318703 A2 5/2011
EP 2918398 A1 9/2015

(Continued)

OTHER PUBLICATIONS

Danish Patent and Trademark Office, Search and Examination Report in PA 2019 70783, dated May 11, 2020.

(Continued)

*Primary Examiner* — Matthew T Largi
(74) *Attorney, Agent, or Firm* — Wood Herron & Evans LLP

(57) ABSTRACT

There is provided a wind turbine blade extending longitudinally in a spanwise direction between a root end and a tip end, and transversely in a chordwise direction between a leading edge and a trailing edge. The wind turbine blade comprises an outer shell defining a substantially hollow interior, and a shear web arranged inside the outer shell and extending longitudinally in the spanwise direction. The shear web comprises an elongate web panel and a mounting flange extending along a longitudinal edge of the web panel, the mounting flange comprising an inboard end portion defining a root end of the mounting flange and an outboard portion defining a tip end of the mounting flange. The outboard portion extends along a majority of the length of the elongate web panel. The inboard end portion of the mounting flange is bonded to an inner surface of the blade shell by a first adhesive, and the outboard portion of the mounting flange is bonded to the inner surface of the blade shell by a second adhesive. The first adhesive has a lower (Continued)

elastic modulus than the second adhesive, and/or a chordwise width of the inboard end portion of the mounting flange is enlarged in comparison to a chordwise width of the outboard portion of the mounting flange adjacent to the inboard end portion.

15 Claims, 4 Drawing Sheets

(56) References Cited

U.S. PATENT DOCUMENTS

2008/0219851 A1* 9/2008 Althoff ................. F03D 1/0675 29/889.71
2009/0226320 A1 9/2009 Torres Martinez
2011/0142662 A1* 6/2011 Fritz ..................... F03D 1/0675 416/233
2012/0027615 A1 2/2012 Irizarry-Rosado et al.
2015/0316023 A1* 11/2015 Sandercock ............ F03D 13/10 29/799
2016/0377048 A1* 12/2016 Caruso .................... B23P 15/04 156/60
2021/0102523 A1* 4/2021 Smith ................... B29C 66/112
2021/0115892 A1* 4/2021 Haahr ................... B29C 66/721

FOREIGN PATENT DOCUMENTS

ES 2333499 A1 2/2010
GB 2535697 A * 8/2016 ............. B29C 65/48
WO 2014086703 A1 6/2014
WO 2017126287 A1 7/2017
WO 2018184643 A1 10/2018
WO 2018184644 A1 10/2018
WO WO-2021078347 A1 * 4/2021 ......... B29C 65/4835

OTHER PUBLICATIONS

European Patent Office, International Search Report and Written Opinion in PCT Application No. PCT/DK2020/050365, dated Mar. 25, 2021.

* cited by examiner (A-A)

WIND TURBINE BLADE

TECHNICAL FIELD

The present invention relates generally to wind turbine blades, and more specifically to a wind turbine blade having an improved shear web.

BACKGROUND

Modern utility scale wind turbines comprise a rotor formed of a plurality of wind turbine blades attached at their root ends to a central hub. Wind turbine blades typically comprise a longitudinally extending spar structure to support a blade shell and to increase the structural and torsional rigidity of the blade. Such a spar structure may include a web bonded within the blade shell to absorb shear loads along the blade. When a blade bends in use, the shear web can experience so-called "peel loads" at its root end, which act to peel the root end of the shear web from the blade shell.

Peel loads can cause cracks to form in a bondline between the shear web and the blade shell. Whilst initially such cracks may not significantly affect the structural load bearing capability of the blade, a crack propagating further along the bondline from the root end of the shear web can significantly impact the structural integrity of the blade. Wind turbine blades experience significant cyclic loading in use which can cause fatigue in the bondline. Such fatigue loading conditions may exacerbate the brittle failure modes caused by peel loads, and in turn may cause minor bondline cracks at the root end to propagate along the bondline into more critical load-bearing regions.

Known solutions for mitigating bondline cracks and crack propagation include applying a laminate patch over the joint between the root end of the shear web and the blade shell. Whilst such laminate patches can help to mitigate crack propagation, their application adds significant time and complexity to the blade manufacturing process, meaning a blade occupies a blade mould for longer, which reduces the throughput of a blade manufacturing facility.

It is against this background that the present invention has been developed.

SUMMARY OF THE INVENTION

In a first aspect of the invention there is provided a wind turbine blade extending longitudinally in a spanwise direction between a root end and a tip end, and transversely in a chordwise direction between a leading edge and a trailing edge. The wind turbine blade comprises an outer shell defining a substantially hollow interior, and a shear web arranged inside the outer shell and extending longitudinally in the spanwise direction. The shear web comprises an elongate web panel and a mounting flange extending along a longitudinal edge of the elongate web panel, the mounting flange comprising an inboard end portion defining a root end of the mounting flange and an outboard portion defining a tip end of the mounting flange. The outboard portion extends along a majority of the length of the elongate web panel. The inboard end portion of the mounting flange is bonded to an inner surface of the blade shell by a first adhesive, and the outboard portion of the mounting flange is bonded to the inner surface of the blade shell by a second adhesive. The first adhesive has a lower elastic modulus than the second adhesive, and/or a chordwise width of the inboard end portion of the mounting flange is enlarged in comparison to a chordwise width of the outboard portion of the mounting flange adjacent to the inboard end portion.

Preferably the first adhesive is a polyurethane based adhesive. Preferably the second adhesive is an epoxy resin such as SikaPower®.

The mounting flange may comprise a kink between the inboard end portion and the outboard portion. For example, the mounting flange may comprise a kink between the inboard end portion and the outboard portion when the mounting flange is seen in plan view.

The chordwise width of the inboard end portion may increase moving in the spanwise direction towards the root end of the mounting flange. The chordwise width of the inboard end portion of the mounting flange may be substantially constant in the region of the root end of the mounting flange before tapering towards the outboard portion of the mounting flange.

The chordwise width of the mounting flange may increase moving towards the root end at a greater rate in the inboard end portion than in the outboard portion. Further, the chordwise width of the mounting flange may be substantially constant throughout the outboard portion.

Preferably, the inboard end portion comprises a chordwise width at least 30% greater than the chordwise width of the outboard portion. More preferably the inboard end portion comprises a chordwise width at least 50% greater. Most preferably the inboard end portion comprises a chordwise width at least 70% greater.

The inboard end portion of the mounting flange may extend over less than 5% of the length of the mounting flange. Preferably the inboard end portion of the mounting flange may extend over less than 2.5% of the length of the mounting flange. More preferably the inboard end portion of the mounting flange may extend over less than 1% of the length of the mounting flange.

The inboard end portion may have a footprint larger than the footprint of a neighbouring section of the outboard portion of the mounting flange immediately adjacent to the inboard end portion, and of equivalent spanwise length to the inboard end portion. The footprint of the inboard end portion may be at least 30% larger than the footprint of the neighbouring section, preferably at least 50% larger, and more preferably at least 70% larger than the footprint of the neighbouring section.

The "footprint" of the inboard end portion refers to the surface area of the mounting flange which is bonded to the inner surface of the shell. Similarly, the "footprint" of the neighbouring section of the outboard portion refers to the surface area of the mounting flange which is bonded to the inner surface of the blade shell.

The inboard end portion of the mounting flange may extend in the spanwise direction inboard of a root end of the elongate web panel. At least 0.1% of the length of the mounting flange may extend in the spanwise direction inboard of the root end of the elongate web panel. Preferably 0.25% of the length of the mounting flange may extend in the spanwise direction inboard of the root end of the elongate web panel. More preferably at least 0.5% of the length of the mounting flange may extend in the spanwise direction inboard of the root end of the elongate web panel.

The root end of the elongate web panel may have a scalloped edge.

The inboard end portion of the mounting flange may be a laminated part comprising a plurality of layers of reinforcing material. The plurality of layers may be arranged in staggered relation.

Preferably the layers of reinforcing material comprise reinforcing fibres. Preferably the fibres are multi-axial. Most preferably the reinforcing material comprises bi-axial or tri-axial fibres. Preferably the layers of reinforcing material comprise substantially no fibres extending in the spanwise direction of the blade. The layers of reinforcing material preferably comprise glass fibres in chopped strand mats or woven fabric plies.

Preferably the inboard end portion of the mounting flange comprises a base and an upstand which extends transversely from the base. The base of the mounting flange may taper in thickness moving in the chordwise direction from the upstand towards a spanwise extending edge of the inboard end portion. Preferably the upstand of the inboard end portion tapers in height moving in the spanwise direction towards the root end of the mounting flange.

The base of the inboard end portion may extend in the spanwise direction inboard of a root end of the upstand. Preferably the base of the inboard end portion tapers in thickness moving in the spanwise direction from the root end of the upstand to the root end of the mounting flange.

The outboard portion of the mounting flange may be a pultruded part.

The mounting flange may comprise a scarf joint between the inboard end portion and the outboard portion.

BRIEF DESCRIPTION OF THE DRAWINGS

Embodiments of the present invention will now be described by way of non-limiting example only, with reference to the accompanying figures, in which.

DETAILED DESCRIPTION

Figure 1:
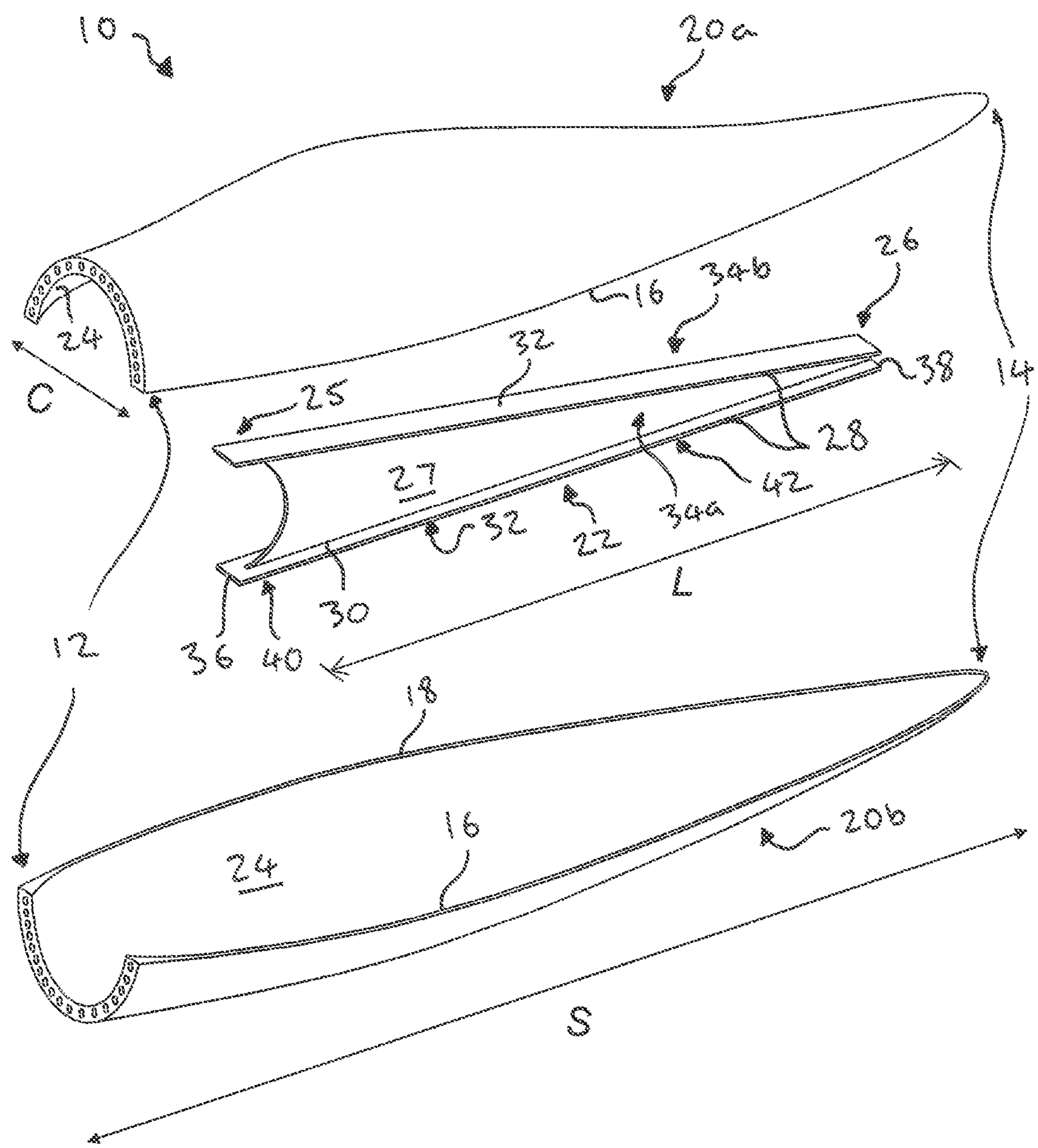
FIG. 1 is a schematic exploded view of a wind turbine blade comprising a shear web between two halves of a blade shell.

FIG. 1 is a schematic exploded view of a wind turbine blade 10. The blade 10 extends longitudinally in a spanwise direction (S) between a root end 12 and a tip end 14, and transversely in a chordwise direction (C) between a leading edge 16 and a trailing edge 18. The blade 10 comprises an outer shell 20 of composite construction. In this example, the blade shell 20 is made of glass-fibre reinforced plastic (GFRP), and is formed of a first (windward) half shell 20*a* and a second (leeward) half shell 20*b*. The outer shell 20 defines a substantially hollow interior when the first and second half shells 20*a*, 20*b* are bonded together.

The wind turbine blade 10 comprises a shear web 22 arranged inside the outer shell 20, i.e. inside the hollow interior of the blade 10. As will be described in more detail later with reference to FIG. 2, the shear web 22 is adhesively bonded to inner surfaces 24 of the blade shell 20 using two different adhesives in this example. The shear web 22 forms part of a spar structure which is configured to absorb bending and torsional loading of the blade 10 in use. The shear web 22 extends longitudinally in the spanwise direction (S) from a root end 25 to a tip end 26 and comprises an elongate web panel 27.

In this example, the shear web 22 comprises a mounting flange 28 extending along each longitudinal edge 30 of the elongate web panel 27. The flanges 28 extend transversely from the elongate web panel 27 to provide a bonding surface 32 via which the shear web 22 is bonded to the blade shell 20. In this example, the shear web 22 comprises a substantially I-shaped cross section wherein the mounting flanges 28 extend transversely to the elongate web panel 27 on both a first side 34*a*, and on an opposing second side 34*b*, of the shear web 22.

In this example, each mounting flange 28 is a single continuous part which extends between a root end 36 of the mounting flange 28 and a tip end 38. Each mounting flange 28 of the shear web 22 in this example is a pultruded part. That is to say, the mounting flange 28 is formed in a pultrusion process wherein reinforcing fibres are drawn through a die and cured in a resin matrix. As such, in this example the mounting flange 28 comprises a substantially constant cross section throughout its length L.

Each mounting flange 28 comprises an inboard end portion 40 and an outboard portion 42. "Inboard" and "outboard" refer to the relative position of the portions 40, 42 in relation to the root end 12 of the blade 10. Accordingly, the inboard end portion 40 is closer to the root end 12 of the blade 10 than the outboard portion 42. The inboard end portion 40 defines the root end 36 of the mounting flange 28, and the outboard portion 42 defines the tip end 38 of the mounting flange 28.

The inboard end portion 40 of the mounting flange 28 constitutes a minority of the spanwise length L of the mounting flange 28, whilst the outboard portion 42 constitutes a majority of the spanwise length L of the mounting flange 28. In this example the inboard end portion 40 comprises approximately 2.5% of the total spanwise length L of the mounting flange 28. Conversely, the outboard portion 42 constitutes approximately 97.5% of the spanwise length L of the mounting flange 28. In other examples the inboard end portion 40 may constitute more or less than 2.5% of the total length L of the mounting flange 40.

Figure 2:
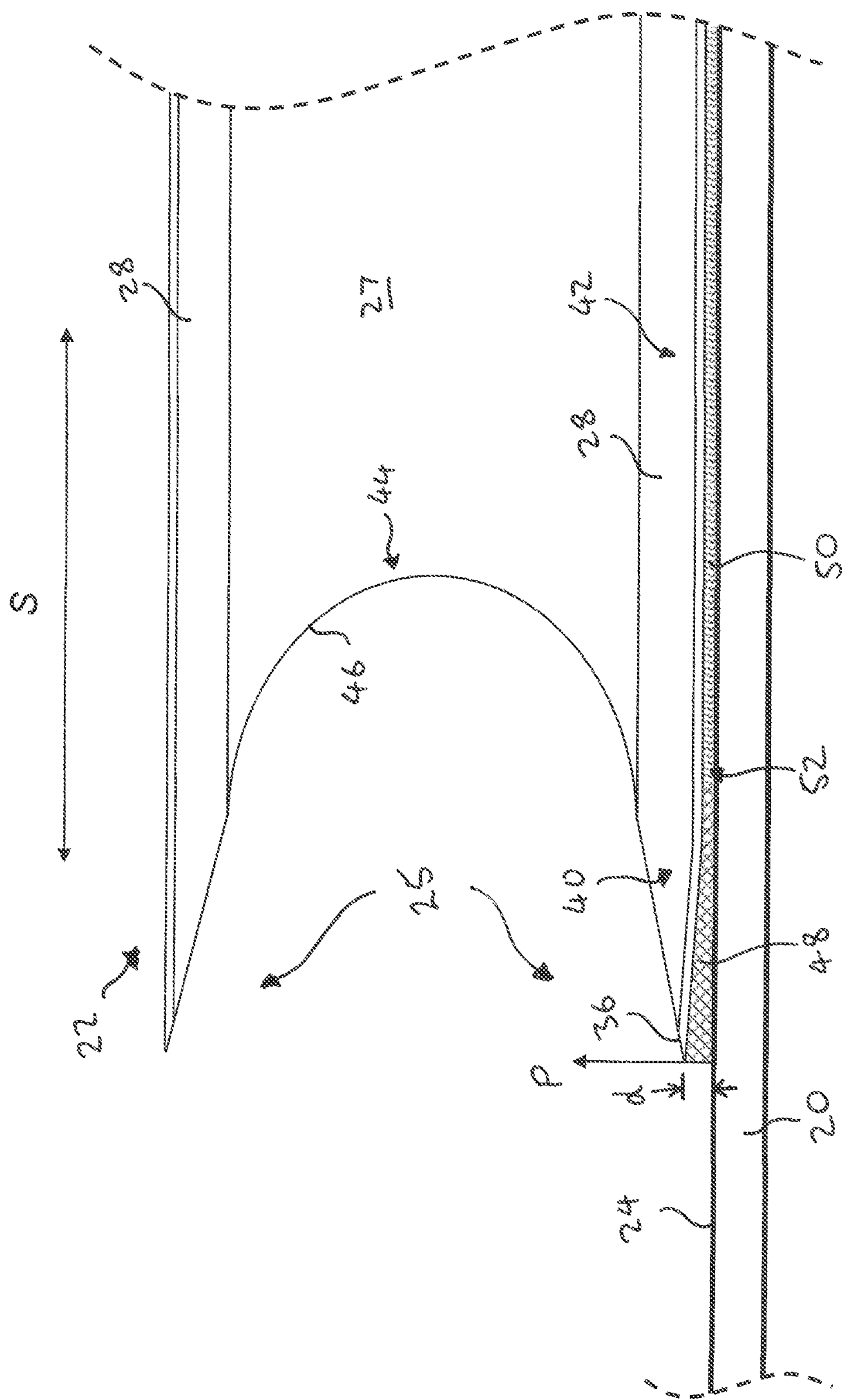
FIG. 2 is a schematic side view of the shear web bonded to the blade shell.

FIG. 2 shows the shear web 22 adhesively bonded to the inner surface 24 of the blade shell 20 in a schematic side view. In this example a root end 44 of the elongate web panel 27 has a scalloped edge 46. The scalloped edge 46 helps to distribute stresses at the root end 25 of the shear web 22 to minimize stress concentrations and gradually transfer loads from the elongate web panel 27 to the blade shell 20 via the mounting flanges 28. The scalloped edge 46 can also facilitate easier access to the interior of the blade 10 during maintenance works. Further, in this example the inboard end portion 40 of the mounting flange 28 extends inboard of the root end 44 of the elongate web panel 27 in the spanwise direction (S). This spanwise extension of the inboard end portion 40 further aids in the distribution of stresses at the root end 25 of the shear web 22 and facilitates a gradual transfer of loads between the elongate web panel 27 and the blade shell 20.

In this example, a first adhesive 48 is used to bond the inboard end portion 40 of the mounting flange 28 to the inner surface 24 of the blade shell 20. A second adhesive 50 is used to bond the outboard portion 42 of the mounting flange 28 to the inner surface 24 of the blade shell 20. The first and second adhesives 48, 50 are different adhesives which each have different properties. In particular, the first adhesive 48 has a lower elastic modulus than the second adhesive 50. Consequently, the first adhesive 48 can endure a higher amount of strain before failure than the second adhesive 50. Therefore, in contrast to prior art wind turbine blades in which the same adhesive is used along the entire shear web, in this example two different adhesives 48, 50 are used along different sections 40, 42 of the shear web 22 to bond the shear web 22 to the blade shell 20.

In preferred examples, the first adhesive 48 is a polyurethane based adhesive because these typically have a relatively low elastic modulus. Conversely, the second adhesive 50 is a structural adhesive and is preferably an epoxy resin such as SikaPower®. The adhesive 50 used to bond the majority of the mounting flange 28 to the blade shell 20 therefore provides a strong and more rigid bond between the outboard portion 42 and the blade shell 20.

As previously described, the shear web 22 is part of a spar structure that absorbs bending loads along the length of the blade 10. In use, when the blade 10 bends the shear web 22 may experience loads in the spanwise direction (S) as the windward and leeward sides of the blade 10 move relative to one another. Such spanwise loads can result in so-called peel loads at the root end 25 of the shear web 22 as described above by way of background. Forces pulling the shear web 22 towards the tip end 14 of the blade 10 act to peel the root end 36 of the mounting flange 28 away from the inner surface 24 of the blade shell 20. A peel load is indicated in FIG. 2 by arrow P. Peel loads P may cause the root end 36 of the mounting flange 28 to be pulled away from the blade shell 20 by a distance d.

However, using a first adhesive 48 with a relatively lower modulus to bond the root end 36 of the mounting flange 28 mitigates the risk of cracking in a bondline 52 between the shear web 22 and blade shell 20. For example, as shown in FIG. 2, the root end 36 of the mounting flange 28 remains connected to the inner surface 24 of the blade shell 20 despite being pulled away by peel load P. The relatively low elastic modulus of the first adhesive 48 between the inboard end portion 40 and the blade shell 20 means that the adhesive 48 can deform and stretch as the peel load P pulls the flange 28 away from the surface 24. The higher strain to failure of the first adhesive 48 means the first adhesive stays in the elastic phase throughout peel loading, and the elasticity of the first adhesive 48 means that the bondline 52 is less vulnerable to fatigue-induced damage during cyclic loading. Spanwise propagation of any potential cracks from the root end 25 of the shear 22 web is therefore avoided.

The combination of the first and second adhesives 48, 50 to bond the inboard end portion 40 and outboard portion 42 of the mounting flange 28 results in a bondline 52 between the shear web 22 and blade shell 20 having optimal structural properties throughout. The first adhesive 48 reduces the risk of crack formation at the root end 25 and limits crack propagation along the bondline 52 due to its relatively low elastic modulus. The second adhesive 50, bonding the outboard portion 42 to the blade shell 20, provides the requisite strength to rigidly bond the majority of the shear web 22 to the blade shell 20 to transfer loads between the web 22 and blade shell 20.

A wind turbine blade 10 comprising a shear web 22 bonded to the blade shell 20 as described above is capable of withstanding peel loads P in use and is therefore more durable than wind turbine blades of the prior art. In particular, failure initiation is prevented because the adhesive 48 bonding the root end 36 of the mounting flange 28 to the blade shell 20 has a relatively low elastic modulus and a relatively high strain to failure which enables the web 22 to remain adhered to the shell 20 to prevent fatigue damage and crack propagation.

As the lower modulus adhesive 48 is used only in a minor portion of the shear web 22 at the root end 25, the overall bond strength between the shear web 22 and the blade shell 20 is not appreciably affected.

Figure 3:
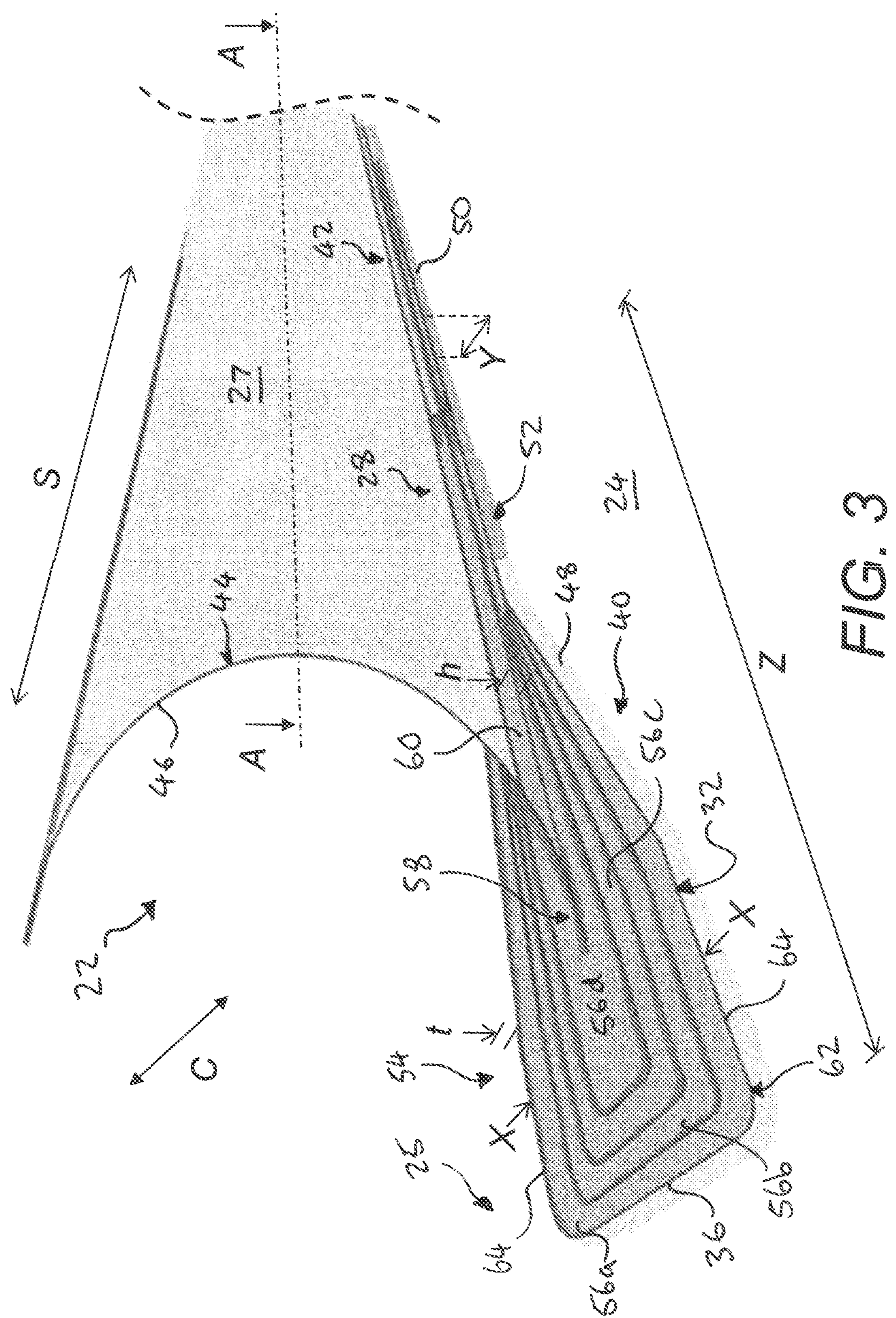
FIG. 3 is a schematic perspective view of another example of a shear web.

FIG. 3 shows a further example of a shear web 22 that is bonded to the inner surface 24 of a blade shell 20. In this example the root end 44 of the elongate web panel 27 has a scalloped edge 46, in common with the shear web 22 previously described with reference to FIG. 2. The shear web 22 in this example further comprises a mounting flange 28 which has an enlarged inboard end portion 40. The enlarged inboard end portion 40 may also be referred to as a “foot” or “web foot”.

The inboard end portion 40 in this example has a chordwise width X and the outboard portion 42 of the mounting flange 28 has a chordwise width Y. In this example, the chordwise width X of the inboard end portion 40 is enlarged compared to the chordwise width Y of the adjacent outboard portion 42. In preferred examples such as that shown in FIG. 3, the chordwise width X of the inboard end portion 40 is at least 70% greater than the chordwise width Y of the outboard portion 42.

The enlarged chordwise width X results in the inboard end portion 40 having an enlarged footprint. More specifically, the inboard end portion 40 has a larger footprint than an adjacent section of the outboard portion 42 extending over the same spanwise length Z. That is to say, the bonding surface 32 of the mounting flange 28 has a greater surface area per unit of spanwise length in the inboard end portion 40 than in the outboard portion 42. The enlarged surface area of the inboard end portion 40 of the mounting flange 28 enables loads to be distributed over a larger area and reduces stress concentrations at the root end 25 of the shear web 22. Further, the increased surface area of the inboard end portion 40 serves to diminish peel loads P by distributing the force over a greater area.

In this example, the inboard end portion 40 also extends inboard of the root end 44 of the elongate web panel 27 in the spanwise direction (S). In terms of the total spanwise length L of the mounting flange 28, in this example the portion 54 extending inboard of the shear web panel 27 constitutes about 0.5% of the total length L of the mounting flange 28. In other examples more than 0.5% of the length L of the mounting flange 28 may extend inboard of the elongate web panel 27 to provide an even greater bonding surface area 32 at the root end 25 of the shear web 22.

The inboard end portion 40 of the mounting flange 28 in this example is a laminated part. The inboard end portion 40 therefore comprises a plurality of layers 56*a-d* of reinforcing material 56*a-d* in a resin matrix. Conversely, the outboard portion 42 of the mounting flange 28 may be a pultruded part, similar to the mounting flange 28 previously described with reference to FIG. 2.

In preferred examples such as that shown in FIG. 3, the layers of reinforcing material 56*a-d* in the laminate inboard end portion 40 of the mounting flange 28 comprise plies of multi-axial reinforcing fibres such as bi-axial or tri-axial glass or carbon fibres. Reinforcing material 56 comprising multi-axial fibres is preferred so that the percentage of reinforcing fibres extending in the spanwise direction (S) of the blade 10 can be minimized or eliminated entirely. A mounting flange 28 comprising multi-axial reinforcing fibres advantageously does not absorb spanwise loads in the blade 10, and these loads are instead carried by other spar components specifically designed to bear spanwise loads.

The mounting flange 28 is built up by arranging successive layers of reinforcing material 56*a-d* (in this case fibrous fabric) on top of one another. In this example, the layers 56*a-d* are arranged in staggered relation to one another. Successive layers of reinforcing material 56*a-d* therefore each have decreasing spanwise and chordwise dimensions relative to a previous layer of reinforcing material 56*a-d*. The layers of reinforcing material 56*a-d* are built up such that the inboard end portion 40 has a maximum thickness tin a central portion 58 where an upstand 60 connects the mounting flange 28 to the shear web panel 27.

Accordingly, the mounting flange 28 tapers in thickness t towards its periphery 62. That is to say, the thickness t decreases with spanwise distance from the upstand 60 towards the root end 36 of the mounting flange 28, and also decreases in thickness t with chordwise distance from the upstand 60 towards spanwise-extending edges 64 of the foot 40. The tapering thickness t of the mounting flange 28 facilitates a gradual transfer of loads between the elongate web panel 27 and the blade shell 20 with minimal stress concentrations.

Further, the upstand 60 of the inboard end portion 40 tapers in height h towards the root end 36 of the mounting flange 28 from the point at which the scalloped edge 46 of the shear web panel 27 is connected to the upstand 60. The tapering height h of the upstand 60 serves to gradually transfer loads from the elongate web panel 27 to the blade shell 20 via the mounting flange 28.

Figure 4:
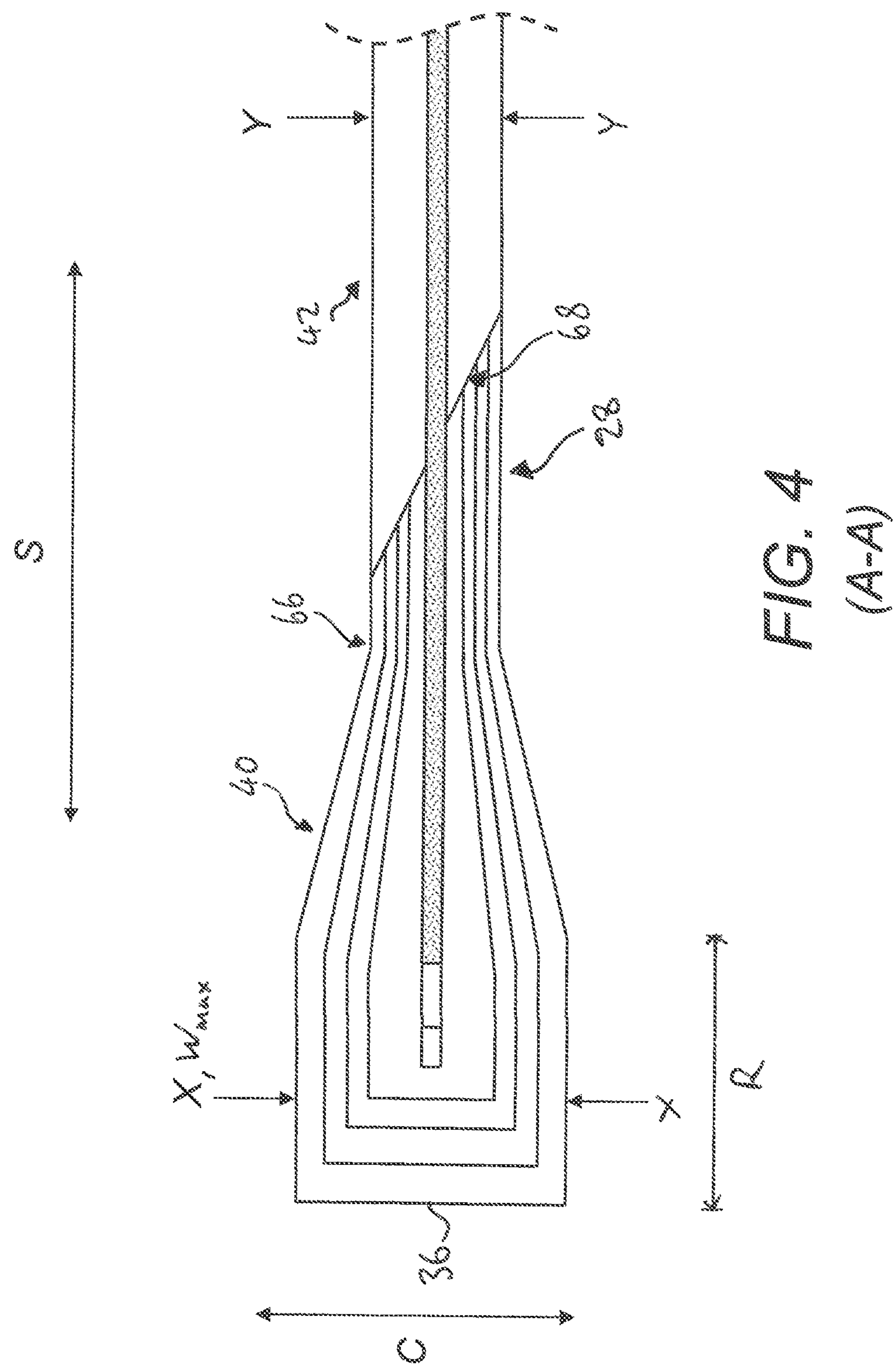
FIG. 4 is a cross-sectional view of the shear web taken along the line A-A in FIG. 3.

FIG. 4 is a cross-sectional view taken along line A-A in FIG. 3 and shows the mounting flange 28 in a plan view.

The mounting flange 28 is most susceptible to peel loads at its root end 36. In this example the mounting flange 28 therefore has a maximum chordwise width $W_{max}$ at its root end 36. To ensure that the bonding surface 32 has a large surface area, the chordwise width X of the inboard end portion 40 of the mounting flange 28 is substantially constant in the region of the root end 36, i.e. a spanwise region R towards the root end 36 of the inboard end portion 40 has the maximum chordwise width $W_{max}$ The inboard end portion 40 of the mounting flange 28 then tapers in chordwise width X from the maximum width $W_{max}$ down to the width Y of the outboard portion 42 towards the outboard portion. It will be appreciated that the footprint of the inboard end portion 40 is enlarged in comparison to the footprint of the adjacent outboard portion 42 as previously described with reference to FIG. 3.

In this example, the chordwise width Y of the mounting flange 28 is substantially constant throughout the outboard portion 42. Conversely, in the inboard end portion 40 of the mounting flange 28, the chordwise width X increases moving in the spanwise direction (S) towards the root end 36 of the flange 28. The mounting flange 28 therefore comprises a kink 66 where the chordwise width X initially changes.

In some examples, the chordwise width Y of the outboard portion 42 may not be constant throughout the outboard portion 42. In such an example, the width Y of the mounting flange 28 may gradually increase from a minimum chordwise width at the tip end 38 of the mounting flange 28 (not shown) to a maximum chordwise width Y adjacent to the inboard end portion 40 of the mounting flange 28. However, regardless of whether the outboard portion 42 is of constant chordwise width Y or not, the chordwise width of the mounting flange 28 increases moving towards the root end 36 at a greater rate in the inboard end portion 40 than in the outboard portion 42.

The shear web 22 in this example comprises a scarf joint 68 in the mounting flange 28 between the inboard end portion 40 and the outboard portion 42. The scarf joint 68 advantageously provides a smooth load path between the two portions 40, 42 of the mounting flange 28 such that stress concentrations are minimised at the interface between the inboard end portion 40 and the outboard portion 42.

A wind turbine blade 10 comprising a shear web 22 as described with reference to FIGS. 3 and 4 is capable of withstanding peel loads P in use and is therefore more durable than wind turbine blades of the prior art. In particular, failure initiation is prevented because the mounting flange 28 has an enlarged footprint in the inboard end portion 40 such that any peel loads P acting at the root end 36 of the mounting flange 28 are distributed over a larger surface area and therefore do not lead to crack initiation and propagation.

In the example described with reference to FIGS. 3 and 4, the inboard end portion 40 of the mounting flange 28 is preferably bonded to the blade shell 20 by a first adhesive 48, and the outboard portion 42 of the mounting flange 28 is preferably bonded to the blade shell 20 using a second adhesive 50. As previously described with reference to the example in FIG. 2, the first adhesive 48 has a lower elastic modulus than the second adhesive 50. Suitable adhesives for this purpose have already been described with reference to FIG. 2. Also, the advantages of using a lower-modulus adhesive to bond the inboard end portion 40 have already been described with reference to FIG. 2 and these advantages apply equally to each of the examples disclosed herein. Repetition of these details is avoided for reasons of conciseness.

In other examples, the shear web 22 described with reference to FIGS. 3 and 4, i.e. comprising an enlarged foot 40, may be bonded to the blade shell 20 using a single adhesive along substantially the entire mounting flange 20. That is to say, in some examples, the increased surface area of the bonding surface 32 effectively distributes potential peel loads P such that an adhesive with a lower elastic modulus may not be required at the root end 36.

However, in preferred examples such as that shown in FIGS. 3 and 4, the mounting flange 28 comprises an enlarged inboard end portion 40, which is bonded to the blade shell 20 using a lower modulus adhesive 48 than the adhesive 50 used to bond the remaining outboard portion 42 of the mounting flange 28 to the blade shell 20. Both measures (the enlarged web foot 40 and the use of a lower modulus adhesive 48 at the root end 36) when taking in combination have been proven to be particularly effective at resisting peel loads P.

In some examples the mounting flange 28 may be substantially the same chordwise width throughout, i.e. the inboard end portion 40 and the outboard portion 42 each having substantially the same chordwise width (as shown in FIG. 1). In such an example, using a first and second adhesive 48, 50 as described above with reference to FIG. 2, wherein the first adhesive 48 has a lower elastic modulus than the second adhesive 50, may provide the required structural characteristics in the bondline 52 to mitigate the risk of peel loads P and fatigue causing cracks to propagate along the bondline 52.

It will be appreciated that features described in relation to each of the examples above may be readily combined with features described with reference any other example without departing from the scope of the invention as defined in the appended claims.

Further, it will be appreciated that the above description and accompanying figures are provided merely as an example. Many alternatives to the wind turbine blade, shear web and mounting flange described above are therefore possible without departing from the scope of the invention as defined in the appended claims.

The invention claimed is:

1. A wind turbine blade extending longitudinally in a spanwise direction between a root end and a tip end, and transversely in a chordwise direction between a leading edge and a trailing edge, the wind turbine blade comprising:

an outer shell defining a substantially hollow interior, a shear web arranged inside the outer shell and extending longitudinally in the spanwise direction, the shear web comprising an elongate web panel and a mounting flange extending along a longitudinal edge of the elongate web panel, the mounting flange comprising an inboard end portion defining a root end of the mounting flange and an outboard portion defining a tip end of the mounting flange, the outboard portion extending along a majority of a length of the elongate web panel, wherein the inboard end portion of the mounting flange is bonded to an inner surface of the outer shell by a first adhesive, and the outboard portion of the mounting flange is bonded to the inner surface of the outer shell by a second adhesive, the first adhesive having a lower elastic modulus than the second adhesive, and/or wherein a chordwise width of the inboard end portion of the mounting flange is enlarged in comparison to a chordwise width of the outboard portion of the mounting flange adjacent to the inboard end portion.

2. The wind turbine blade of claim 1, wherein the mounting flange comprises a kink between the inboard end portion and the outboard portion.

3. The wind turbine blade of claim 1, wherein the chordwise width of the inboard end portion increases moving in the spanwise direction towards the root end of the mounting flange.

4. The wind turbine blade of claim 1, wherein the chordwise width of the inboard end portion of the mounting flange is substantially constant in a region of the root end of the mounting flange before tapering towards the outboard portion of the mounting flange.

5. The wind turbine blade of claim 1, wherein the chordwise width of the mounting flange increases moving towards the root end of the mounting flange at a greater rate in the inboard end portion than in the outboard portion.

6. The wind turbine blade of claim 1, wherein the chordwise width of the mounting flange is substantially constant throughout the outboard portion.

7. The wind turbine blade of claim 1, wherein the inboard end portion of the mounting flange extends over less than 5% of the length of the mounting flange.

8. The wind turbine blade of claim 1, wherein the inboard end portion has a footprint larger than a footprint of a neighbouring section of the outboard portion of the mounting flange immediately adjacent to the inboard end portion, and of equivalent spanwise length to the inboard end portion, wherein the footprint of the inboard end portion is at least 30% larger than the footprint of the neighbouring section.

9. The wind turbine blade of claim 1, wherein the inboard end portion of the mounting flange extends in the spanwise direction inboard of a root end of the elongate web panel.

10. The wind turbine blade of claim 9, wherein at least 0.1% of a length of the mounting flange, extends in the spanwise direction inboard of the root end of the elongate web panel.

11. The wind turbine blade of claim 1, wherein the root end of the elongate web panel has a scalloped edge.

12. The wind turbine blade of claim 1, wherein the inboard end portion of the mounting flange is a laminated part comprising a plurality of layers of reinforcing material.

13. The wind turbine blade of claim 12, wherein the plurality of layers are arranged in staggered relation.

14. The wind turbine blade of claim 1, wherein the outboard portion of the mounting flange is a pultruded part.

15. The wind turbine blade of claim 1, wherein the mounting flange comprises a scarf joint between the inboard end portion and the outboard portion.

* * * * *